US007620400B2

(12) United States Patent
Jacobson et al.

(10) Patent No.: US 7,620,400 B2
(45) Date of Patent: Nov. 17, 2009

(54) INTER-SYSTEM MESSAGE DELIVERY FOR SMS TEXT MESSAGES

(75) Inventors: Terry Jacobson, Deerfield, IL (US); Paresh C. Kanabar, Naperville, IL (US); Mark Alan McCormick, Naperville, IL (US); John C. V. Nguyen, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 389 days.

(21) Appl. No.: 11/267,992

(22) Filed: Nov. 7, 2005

(65) Prior Publication Data

US 2007/0105535 A1    May 10, 2007

(51) Int. Cl.
*H04W 36/00* (2009.01)
(52) U.S. Cl. .................. 455/438; 455/432.1; 455/432.2; 455/422.1; 455/443
(58) Field of Classification Search ............... 455/412.2, 455/453, 466, 422.1, 432.1–432.3, 435, 443, 455/438
See application file for complete search history.

(56) References Cited

U.S. PATENT DOCUMENTS 5,797,094 A * 8/1998 Houde et al. ............. 455/412.2

2005/0009534 A1 * 1/2005 Harris et al. ................. 455/453

* cited by examiner

*Primary Examiner*—Patrick N. Edouard
*Assistant Examiner*—Wayne Cai
(74) *Attorney, Agent, or Firm*—Patton Boggs, LLP

(57) ABSTRACT

The present Inter-System Message Delivery System increases the SMS text message delivery success rate. When a mobile subscriber station roams outside of the confines of the cell in which it is presently registered, the delivery of SMS messages to mobile subscriber stations fails, since the mobile subscriber station is not present in the Serving Mobile Switching Center to receive the SMS message. This is particularly common when the mobile subscriber station is moving within the confines of a border cell or multiple cells of a Border Mobile Switching Center and is not yet registered at this Border Mobile Switching Center. The SMS message delivery process initiates a page to the mobile subscriber station via inter-system or inter-Mobile Switching Center paging. Once the mobile subscriber station is located, the bearer data for this mobile subscriber station is forwarded from the Serving Mobile Switching Center to the Border Mobile Switching Center in which the mobile subscriber station is presently located The mobile subscriber station is finally registered at the Border MSC.

16 Claims, 3 Drawing Sheets

INTER-SYSTEM MESSAGE DELIVERY FOR SMS TEXT MESSAGES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A COMPACT DISK APPENDIX

Not applicable.

FIELD OF THE INVENTION

This invention relates to cellular communications and, in particular, to a system that enables a Serving Mobile Switching Center (MSC) to deliver SMS text messages and Voice-Mail/Message Waiting Indications to mobile subscriber stations that roam outside the coverage area of the cells of the Serving Mobile Switching Center.

BACKGROUND OF THE INVENTION

It is a problem in the field of cellular communication networks to enable a mobile subscriber to receive SMS text messages and Voice-Mail/Message Waiting Indications when they roam outside the coverage area of the cell in which they are presently registered and more particularly when they encounter a border condition between Mobile Switching Centers.

Mobile service providers seek to increase the maximum number of Busy Hour Call Attempts (BHCA) in order to serve the ever-increasing number of mobile subscribers. One of the major roadblocks to increasing the number of mobile subscribers served by a Mobile Switching Center is the availability of sufficient paging channel bandwidth between the Mobile Switching Center and the mobile subscriber stations. The paging channel is a channel used by the cell to send pages, which indicate incoming calls, to the mobile subscriber station.

However, SMS traffic also uses the paging channel to deliver messages to the mobile subscriber stations. This service has doubled in the past few years and continues to increase significantly each year. This growth is due to both the rapid growth in SMS messaging resulting from the popularity of text messaging between subscribers and the increase in service provider services, such as the use of SMS to provide Voice Mail/Message Waiting Indications. These services collectively consume a significant amount of the paging channel bandwidth, which is a critical network resource, and the paging channel is on the threshold of full utilization, thereby impeding the ability of the Mobile Switching Centers to serve additional call attempts from mobile subscriber stations.

This problem is most commonly encountered in the case of a border service area, which is the location where the service area of a first Mobile Switching Center overlaps the service area of a second Mobile Switching Center. This situation occurs because the cell site radio frequency signals transmitted by the various base station subsystems served by the Mobile Switching Centers are not precisely bounded; and to provide continuity of service to the mobile subscribers, the radio frequency signals from one base station subsystem must overlap with the radio frequency signals from an adjacent base station subsystem. Therefore, the mobile subscriber stations are designed to select the base station subsystem originating the strongest signal to ensure reliable communications as the mobile subscriber roams among multiple cell sites.

In this environment, when the mobile subscriber's movements cause the mobile subscriber station to switch among cell sites on a frequent basis (termed "border condition" herein), the mobile subscriber is not provided with accurate message waiting indications and cannot reliably receive the SMS text messages. This is due to the fact that, when the subscriber roams among multiple cell sites served by different Mobile Switching Centers, the mobile subscriber station performs an Autonomous Registration with the new Mobile Switching Center each time the mobile subscriber traverses the border between the service areas of adjacent Mobile Switching Centers (MSC). The Serving Mobile Switching Center registers the mobile subscriber station at its Home Location Register, which then returns the subscriber profile data indicating the features and call data specific for this mobile subscriber station. The mobile subscriber is unaware of this process, and it represents a cellular communication network administrative process that is required to accurately record the present location of the mobile subscriber station in the cellular communication network for call routing purposes, and to provide the mobile subscriber with the set of features for which they are enrolled.

This problem is most serious in a highly congested cellular communication network where there are many border cells. In this environment, when the call handling capacity of a Base Station Subsystem is reached, an additional Base Station Subsystem is added to the Mobile Switching Center to provide the necessary call handling capacity. However, when the call handling capacity of a Mobile Switching Center is reached, the coverage area of the Mobile Switching Center is reduced and a new Mobile Switching Center is installed, thereby creating more border cells. With the increased subscriber population and longer holding times on calls due to new media-based applications, this problem is becoming more prevalent.

This process can continue seriatim as the subscriber roams through various call coverage areas, since each Mobile Switching Center is unaware of the acknowledgement transmitted by the mobile subscriber station to the original Mobile Switching Center and any other previously contacted Mobile Switching Centers. In a highly congested cellular communication network or a cellular communication network with many border cells, the number of paging channel message transmissions becomes excessive and serves to congest the paging channel with unnecessary messages. Ultimately, the paging channel congestion can result in the loss of new call originations and call deliveries.

BRIEF SUMMARY OF THE INVENTION

The above-described problems are solved and a technical advance achieved by the present inter-system message delivery for SMS text messages (termed "Inter-System Message Delivery System" herein), which increases the SMS text message delivery success rate by efficiently delivering text messages to a mobile subscriber station. When a mobile subscriber station roams outside of the confines of the Mobile Switching Center in which it is presently registered, the message process used for delivering SMS text messages and Voice-Mail/Message Waiting Indications (collectively termed "SMS message" herein) to mobile subscriber stations fails, since the mobile subscriber station is not present in the Serving Mobile Switching Center to receive the SMS message. This is particularly common when the mobile subscriber station is moving within the confines of a border cell or multiple cells of a Border Mobile Switching Center and is not yet registered at this Border Mobile Switching Center.

The SMS message delivery process is accomplished by locating the mobile subscriber station by initiating a page to the mobile subscriber station via inter-system or inter-Mobile Switching Center paging. Once the mobile subscriber station is located, the bearer data for this mobile subscriber station is forwarded from the Serving Mobile Switching Center to the Border Mobile Switching Center in which the mobile subscriber station is presently located. The bearer data for this mobile subscriber station is delivered to the mobile subscriber station, and finally the mobile subscriber station is registered in this Border Mobile Switching Center.

The Inter-System Message Delivery System comprises a number of processes that execute in the various Mobile Switching Centers of the cellular communication network and function to use the Inter-System Page (ISSMSPAGE) message to enable the exchange of information between the Serving Mobile Switching Center, the Border Mobile Switching Center, and the mobile subscriber stations served by the Mobile Switching Centers.

DETAILED DESCRIPTION OF THE INVENTION

Figure 1:
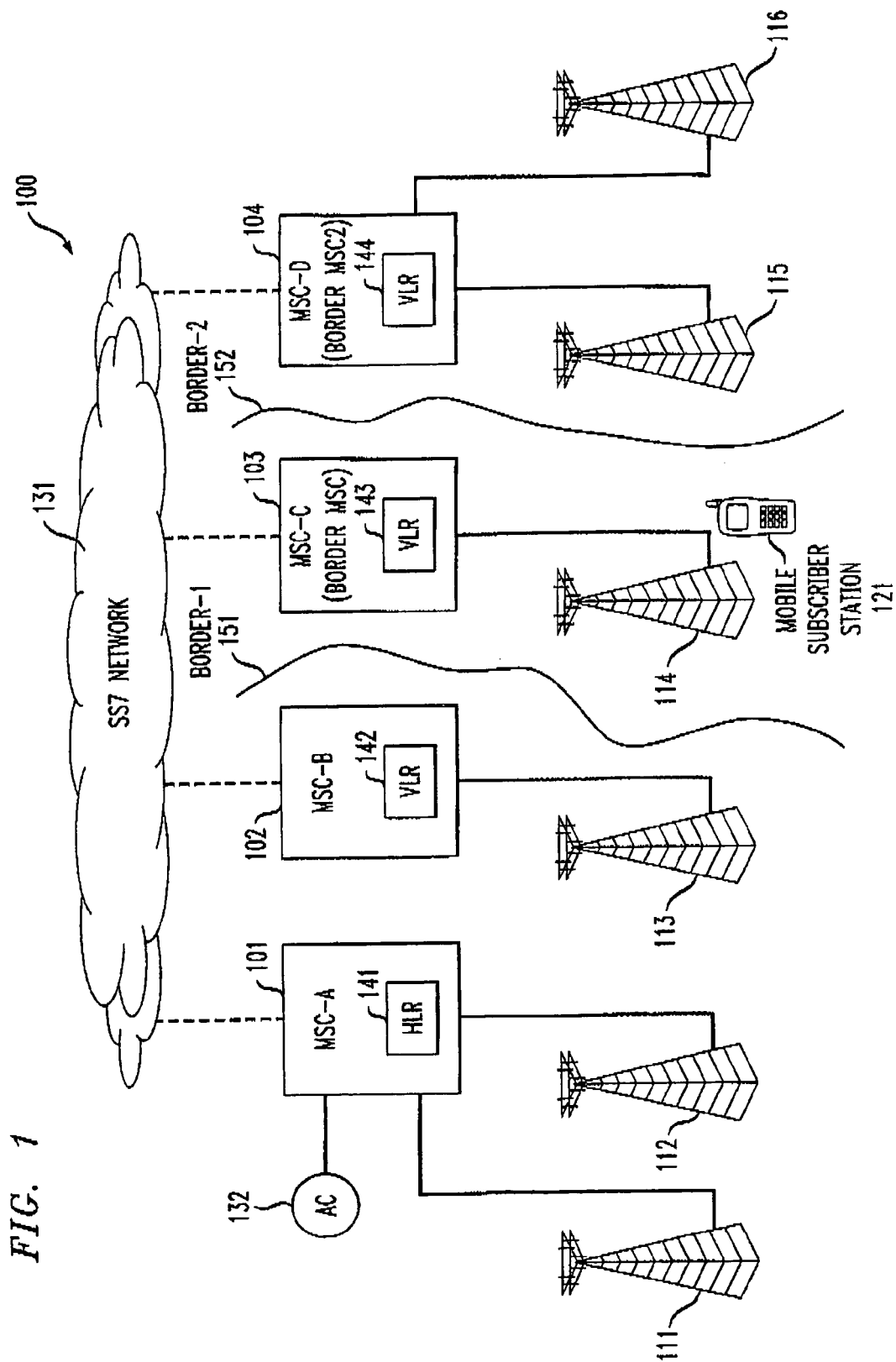
FIG. 1 illustrates, in block diagram form, the configuration of a typical cellular communication network that has a border service area between multiple adjacent Mobile Switching Centers.

Cellular mobile communication systems provide the service of connecting mobile communication customers, each having a mobile subscriber station, to both land-based customers who are served by the common carrier public telephone network and other mobile communication customers. In such a system, if the traffic is circuit switched, all incoming and outgoing calls are routed through Mobile Switching Centers (MSCs), each of which is connected to a plurality of cell sites, which communicate with mobile subscriber stations located in the areas covered by the cell sites.

The terms "cell site" and "cell" are sometimes loosely used in the literature, and the term "cell site" generally denotes the locus at which the transmitter and receiver apparatus is located, while the term "cell" generally denotes the region of space which is served by a particular transmitter-receiver pair which is installed at a cell site. The particular technology used to implement the communications between mobile subscriber stations and the transmitter-receiver pairs, as well as the nature of the data transferred there between, be it voice, video, telemetry, computer data, and the like, are not limitations to the system which is described herein, since a novel system concept is disclosed, versus a specific technologically limited implementation of an existing system concept. Therefore, the term "cellular" as it is used herein denotes a communication system which operates on the basis of dividing space into a plurality of volumetric sections or cells, and managing communications between mobile subscriber stations located in the cells and the associated transmitter-receiver pairs located at the cell site for each of these cells.

The "mobility" in mobile communications is enabled via two communication channels between the cell and the mobile subscriber station: the paging channel and the access channel. The paging channel is used to verify the location of the mobile subscriber station within the network and to deliver the incoming calls and text messages to the mobile subscriber station. The access channel is used by the mobile subscriber station for registration (to report power up, to report changes in location, etc). Presently, when a SMS short text message arrives at the supposedly Serving Mobile Switching Center or Visited Mobile Switching Center for a mobile subscriber station that has wandered off to a neighboring Border Mobile Switching Center, the message delivery fails, since the Visited Mobile Switching Center cannot successfully page the mobile subscriber station.

The forward link uses several logical channels:

1. The Pilot channel modulates a constant symbol and is used for channel estimation, which allows for coherent demodulation of the other channels that carry information bits.

2. The Sync channel is used for providing synchronization and configuration information to the mobile subscriber stations.

3. The Paging channel is a channel used by the cell to send information to the mobile subscriber stations. Pages to the mobile subscriber station indicate incoming calls, while feature notifications are transmitted to the mobile subscriber station to indicate other data, such as indications of voice mail, SMS indications, plus housekeeping information such as the PN Offsets of all nearby cells and sectors.

4. The Traffic channel carries the speech or data.

Similarly, the reverse link has the Traffic and Access logical channels:

1. The Access channel is meant for control information, and is used for originating requests, responding to paging and other messages, or providing other data to the Base Station Subsystem.

2. The Traffic channel carries the speech or data. The Traffic channel supports variable data rate operation.

Cellular Communication Network Architecture

FIG. 1 illustrates, in block diagram form, the configuration of a typical cellular communication network that has a border service area between multiple adjacent Mobile Switching Centers. A cellular communication network 100 consists of a plurality of Mobile Switching Centers 101-104, each of which serves one or more Base Station Subsystems (such as 111-116) that provide the radio frequency links to the plurality of mobile subscriber stations 121 that are operational in each call coverage area (termed "cell") (not shown) provided by the associated Base Station Subsystem. One Mobile Switching Center 101 is typically termed "the subscriber's home Mobile Switching Center", and it maintains the subscriber's identification, authentication, and call services definition data in an associated Home Location Register (HLR) 141, which works in coordination with the Home Authentication Center (AC). Other Mobile Switching Centers 102, 103, 104 maintain their own HLR (not shown) and Visited Location Registers (VLRs) 142, 143, 144 to store call authorization data for subscribers who roam out of their home service area to the call coverage area of the visited Mobile Switching Centers 102, 103, 104. Alternatively, the Home Location Register could be a Standalone Home Location Register (SHLR).

In the case of a border service area, this is the area where the service from a first Mobile Switching Center overlaps the service provided by a second Mobile Switching Center, as indicated in FIG. 1 by lines 151, 152. This situation occurs because the cell site radio frequency signals transmitted by the various Base Station Subsystems served by the Mobile Switching Centers are not precisely bounded; and to provide continuity of service to the mobile subscribers, the radio frequency signals from one Base Station Subsystem must overlap with the radio frequency signals from an adjacent Base Station Subsystem. Therefore, the mobile subscriber's mobile subscriber station is designed to select the Base Station Subsystem producing the strongest signal to ensure reliable communications as the subscriber roams among multiple cell sites.

In this environment, when the mobile subscriber's movements cause the mobile subscriber's mobile subscriber station to switch among cell sites on a frequent basis (termed "border condition" herein), the mobile subscriber's mobile subscriber station must perform an Autonomous Registration with the new Mobile Switching Center each time the mobile subscriber traverses the border between the service areas of adjacent Mobile Switching Centers. The mobile subscriber is unaware of this process, and it represents a cellular communication network administrative process that is required to accurately record the present location of the mobile subscriber mobile subscriber station in the cellular communication network for call routing purposes, and to provide the mobile subscriber with the set of features for which they are enrolled.

SMS Message Origination and Delivery

Figure 2:
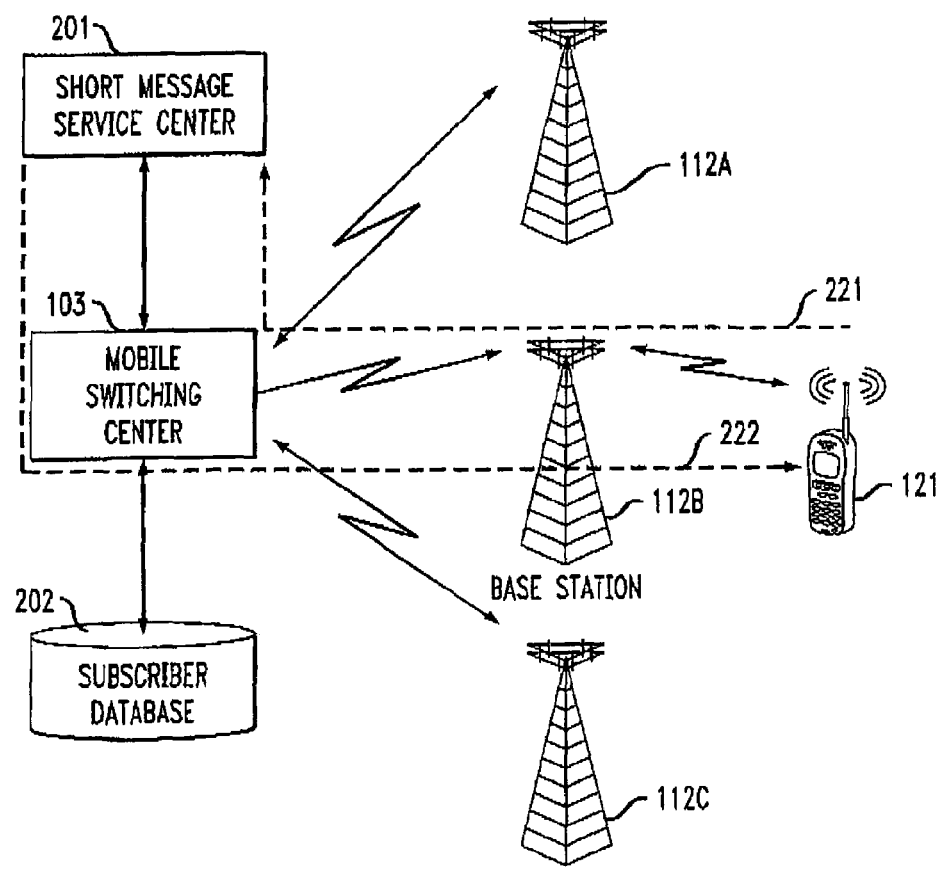
FIG. 2 illustrates, in block diagram form, the delivery of a mobile originated short message and a mobile terminated short message.
Figure 3A:
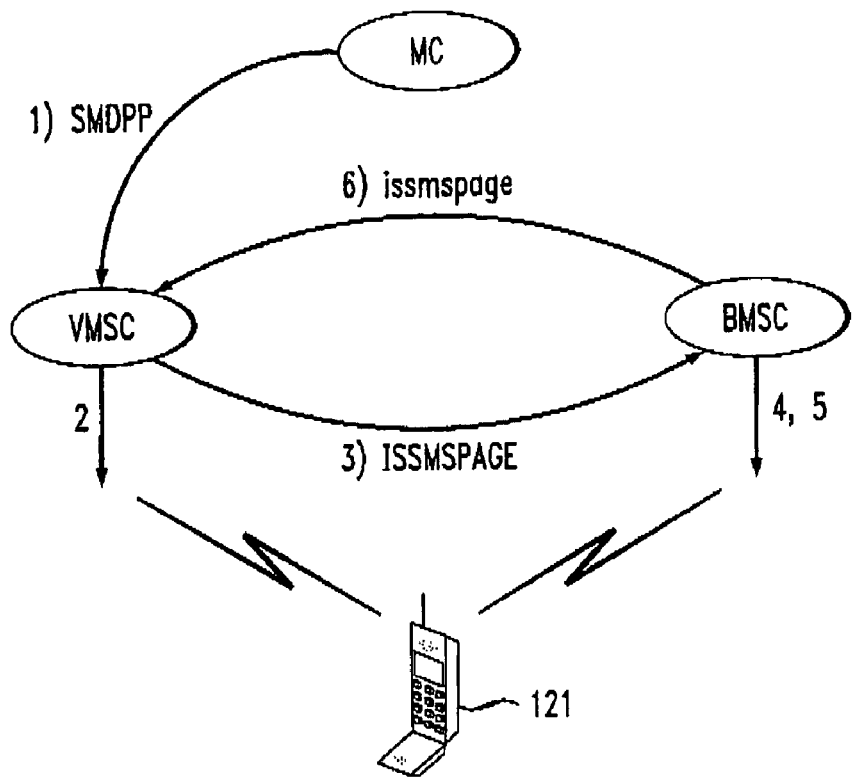
FIGS. 3A and 3B illustrate a message flow among the various system elements of the network of FIG. 1 for a typical inter-system call delivery for an SMS message.
Figure 3B:
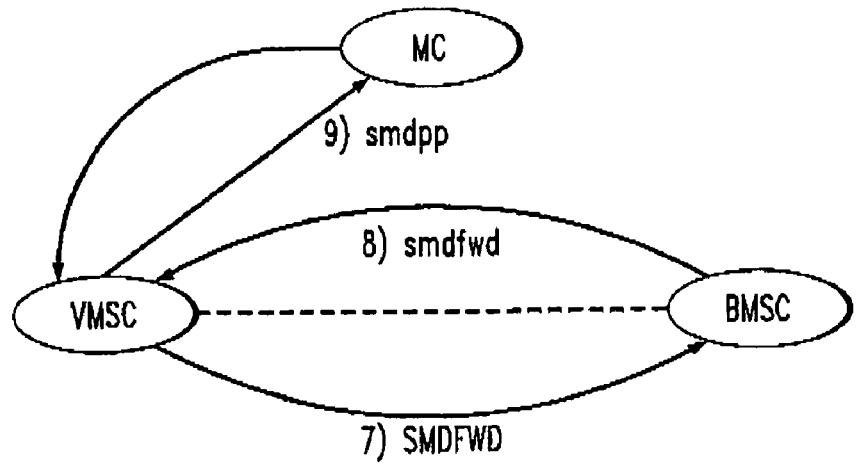

FIG. 2 illustrates, in block diagram form, the delivery of a typical mobile originated short message and a mobile terminated short message; and FIGS. 3A and 3B illustrate a message flow among the various system elements of the cellular communication network 100 of FIG. 1 for a typical inter-system call delivery for an SMS message. The message flow for mobile originated short message is: Mobile Station->BaseStation->MSC->Short Message Service Center (path 221), while Mobile Terminated Short Messages are Short Message Service Center->MSC->BaseStation->Mobile Station (path 222). Base Subscriber Stations 112A-112C are served by Mobile Switching Center 103, and the mobile subscriber station 121 is served by Base Subscriber Station 112B. When mobile subscriber station 121 initiates a text message for transmission to a designated destination (not shown), the text message is relayed by Base Subscriber Station 112 to Mobile Switching Center 103. Mobile Switching Center 103 verifies the authorization of mobile subscriber station 121 to request the text message service by accessing the Subscriber Database 202, which stores the service profiles of the subscribers. The text message originated by mobile subscriber station 121 is then delivered to Short Message Service Center 201 where it is stored until delivered to the designated destination.

The delivery of a message to a designated destination is illustrated in FIG. 3A, where an SMS request is sent to the mobile subscriber's Home Location Register, looking for location information prior to the SMSDPP message being sent. The Short Message Service Center 201 sends bearer data for text delivery to the designated destination mobile subscriber station via a signaling message, such as an ANSI-41 SMS signaling message SMDPP. The Serving Mobile Switching Center that provides service to the designated destination mobile subscriber station pages the designated destination mobile subscriber station and waits for a response to the page. If no response is received from the designated destination mobile subscriber station within a predetermined amount of time, the Serving Mobile Switching Center attempts to locate the designated destination mobile subscriber station.

This is accomplished by the Serving Mobile Switching Center initiating a page request to the Border Mobile Switching Center(s) via the use of a new paging message ISSMSPAGE (or ANSI-41 messages, upper case usually denotes the Invoke component and lower case usually denotes the ReturnResult component), which is transmitted to the Border Mobile Switching Center(s). Upon receipt of the new paging message ISSMSPAGE, the Border Mobile Switching Center (s) page the designated destination mobile subscriber station until the designated destination mobile subscriber station responds to the page by transmitting a response to the Border Mobile Switching Center via the Access channel. The Traffic channel is set up between the Border Mobile Switching Center and the Serving Mobile Switching Center and a new ISSMSPAGE message is transmitted from the Border Mobile Switching Center to the Serving Mobile Switching Center so the Serving Mobile Switching Center can transmit the bearer data to the Border Mobile Switching Center. As shown in FIG. 3B, the Serving Mobile Switching Center sends a forward SMS signaling message SMDFWD that contains bearer data to the Border Mobile Switching Center. The Border Mobile Switching Center sends a data bust to the designated destination mobile subscriber station and returns a SMDFWD message to the Serving Mobile Switching Center to acknowledge receipt of the bearer data and the delivery of this data to the designated destination mobile subscriber station. The designated destination mobile subscriber station is also registered at the Border Mobile Switching Center. Since the message was delivered, the Serving Mobile Switching Center transmits a message delivery acknowledgement message SMDPP to the Short Message Service Center 201. The mobile subscriber station is finally registered at the Border MSC.

SUMMARY

The present Inter-System Message Delivery System increases the SMS text message delivery success rate by initiating a page to the mobile subscriber station via inter-system or inter-Mobile Switching Center paging when the mobile subscriber station is not present in the coverage area of the Serving Mobile Switching Center. Once the mobile subscriber station is located, the bearer data for this mobile subscriber station is forwarded from the Serving Mobile Switching Center to the Border Mobile Switching Center in which the mobile subscriber station is presently located.

What is claimed as new and desired to be protected by Letters Patent of the United States is:

1. An Inter-System Message Delivery System, operable in a cellular communication network, for delivering a text message from a Message Service Center to a mobile subscriber station that has roamed out of the coverage area of a Serving Mobile Switching Center, comprising:

cell paging means for identifying that a cell last accessed by said mobile subscriber station from the Serving Mobile Switching Center, which is not the subscriber's Home Mobile Switching Center, is unable to contact said mobile subscriber station;

border cell identification means for determining that said cell last accessed by said mobile subscriber station is a border cell where the service area of said Serving Switching Center is juxtaposed to the service area of a cell of a Border Switching Center, which is not the subscriber's Home Mobile Switching Center;

mobile subscriber station location determining means for transmitting a paging location request from said Serving Mobile Switching Center to said Border Mobile Switching Center to identify a present cell in said Border Mobile Switching Center in which said mobile subscriber station is operational; and message delivery means, responsive to said mobile subscriber station location determining means, for forwarding said text message from said Serving Mobile Switching Center which is not the subscriber's Home Mobile Switching Center, to said present cell in said Border Mobile Switching Center for transmitting said text message data to said mobile subscriber station.

2. The Inter-System Message Delivery System of claim 1 wherein said mobile subscriber station location determining means comprises:

query means, located in said Serving Mobile Switching Center, for initiating a page request to the Border Mobile Switching Center adjacent said Serving Mobile Switching Center to locate said mobile subscriber station.

3. The Inter-System Message Delivery System of claim 2 wherein said mobile subscriber station location determining means further comprises:

generating means for producing a paging message that identifies said mobile subscriber station and said Serving Mobile Switching Center.

4. The Inter-System Message Delivery System of claim 2 wherein said mobile subscriber station location determining means further comprises:

subscriber paging means, responsive to receipt of said paging message in said Border Mobile Switching Center, for paging the designated destination mobile subscriber station until the designated destination mobile subscriber station responds to the page.

5. The Inter-System Message Delivery System of claim 4 wherein said mobile subscriber station location determining means further comprises:

paging acknowledging means, responsive to location of said mobile subscriber station in said Border Mobile Switching Center, for transmitting an acknowledgement message to said Serving Mobile Switching Center indicative of locating said mobile subscriber station in said Border Mobile Switching Center.

6. The Inter-System Message Delivery System of claim 5 wherein said message delivery means comprises:

text message forwarding means, responsive to said paging acknowledging means, for forwarding said text message and identification of said mobile subscriber station to said Border Mobile Switching Center.

7. The Inter-System Message Delivery System of claim 5 further comprising:

text message delivery acknowledgement means, responsive to said text message being delivered to said mobile subscriber station in said Border Mobile Switching Center, for forwarding identification of said mobile subscriber station and said text message to said Message Service Center.

8. The Inter-System Message Delivery System of claim 1 further comprising:

registration means for registering said mobile subscriber station at the identified Border Mobile Switching Center.

9. A method, operable in a cellular communication network, for delivering a text message from a Message Service Center to a mobile subscriber station that has roamed out of the coverage area of a Serving Mobile Switching Center, comprising:

identifying that a cell last accessed by said mobile subscriber station from the Serving Mobile Switching Center, which is not the subscriber's Home Mobile Switching Center, is unable to contact said mobile subscriber station;

determining that said cell last accessed by said mobile subscriber station is a border cell where the service area of said Serving Switching Center is juxtaposed to the service area of a cell of a Border Switching Center, which is not the subscriber's Home Mobile Switching Center;

transmitting a paging location request from said Serving Mobile Switching Center to said Border Mobile Switching Center to identify a present cell in said Border Mobile Switching Center in which said mobile subscriber station is operational; and forwarding said text message from said Serving Mobile Switching Center, to said present cell in said Border Mobile Switching Center for transmitting said text message data to said mobile subscriber station.

10. The method for delivering a text message of claim 9 wherein said step of identifying comprises:

initiating, in said Serving Mobile Switching Center, a page request to the Border Mobile Switching Center adjacent said Serving Mobile Switching Center to locate said mobile subscriber station.

11. The method for delivering a text message of claim 10 wherein said step of identifying further comprises:

producing a paging message that identifies said mobile subscriber station and said Serving Mobile Switching Center.

12. The method for delivering a text message of claim 10 wherein said step of identifying further comprises:

paging, in response to receipt of said paging message in said Border Mobile Switching Center, the designated destination mobile subscriber station until the designated destination mobile subscriber station responds to the page.

13. The method for delivering a text message of claim 12 wherein said step of identifying further comprises:

transmitting, in response to location of said mobile subscriber station in said Border Mobile Switching Center, an acknowledgement message to said Serving Mobile Switching Center indicative of locating said mobile subscriber station in said Border Mobile Switching Center.

14. The method for delivering a text message of claim 13 wherein said step of forwarding comprises:

forwarding, in response to said paging acknowledgment, said text message and identification of said mobile subscriber station to said Border Mobile Switching Center.

15. The method for delivering a text message of claim 13 further comprising:

forwarding, in response to said text message being delivered to said mobile subscriber station in said Border Mobile Switching Center, identification of said mobile subscriber station and said text message to said Message Service Center.

16. The method for delivering a text message of claim 9 further comprising:

registering said mobile subscriber station at the identified Border Mobile Switching Center.

* * * * *